United States Patent Office 2,725,808
Patented Dec. 6, 1955

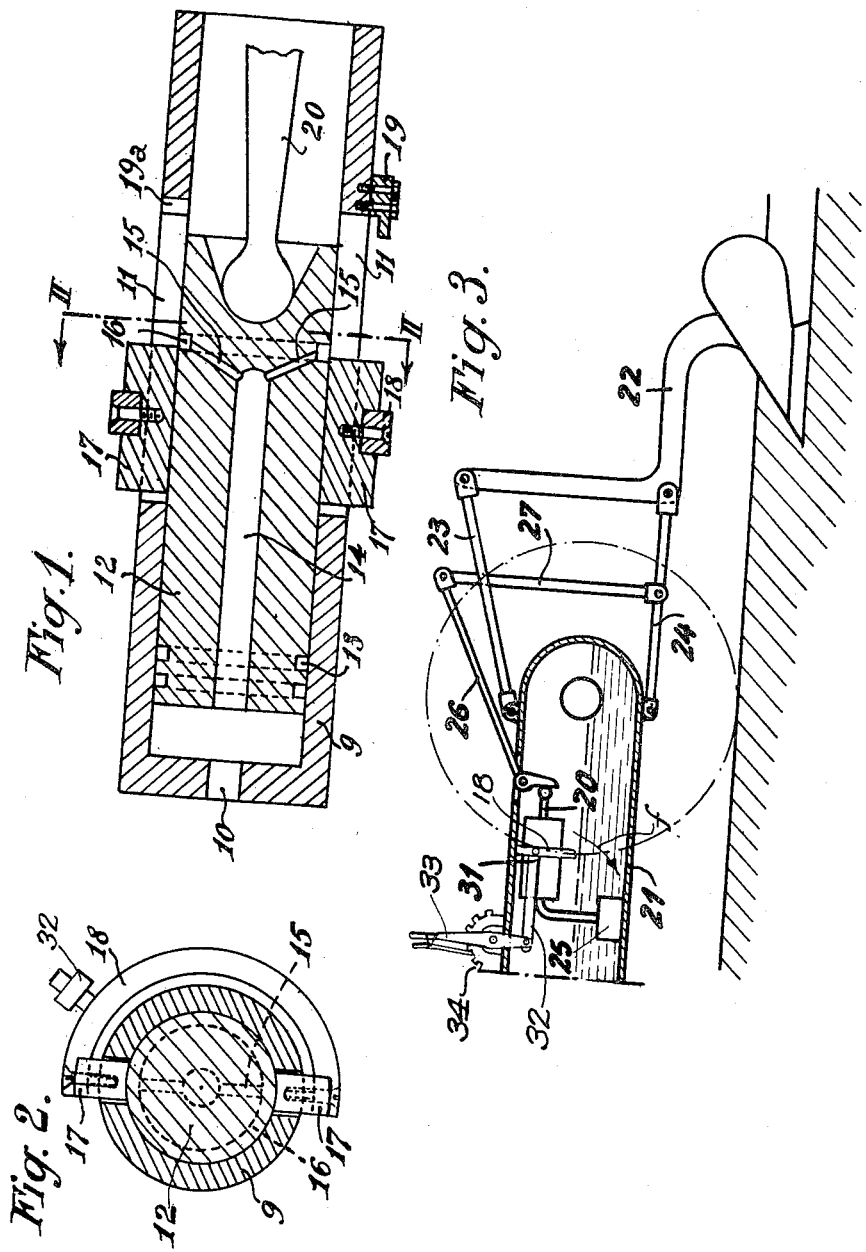

2,725,808

SERVO-MOTOR AND APPLICATION THEREOF, IN PARTICULAR FOR CONNECTING CARRIED IMPLEMENTS TO A TRACTION-ENGINE

André L. A. Morgen, Reims, France

Application April 18, 1950, Serial No. 156,514

Claims priority, application France May 3, 1949

2 Claims. (Cl. 97—46.59)

Servomotors are already known which are permanently fed by a source of fluid under pressure, viz. jacks constituted by a cylinder inside which a piston moves, the cylinder being pierced with a plurality of ports located along a generatrix. By uncovering one of these ports, it is possible to impart thereby to the piston a predetermined position in the cylinder, owing to the fact that, responsive to the pressure of the fluid, the piston moves until the uncovered port which constitutes an exhaust, causes a drop in the fluid pressure preventing further displacement of the piston.

Assuming the piston to be subjected to a permanent force opposite to the pressure of the fluid, the piston is stabilized in the imparted position, since the exhaust port tends to be obturated when this force displaces the piston, so that the pressure of the fluid increases, thus returning the piston to its initial position.

These known types of servomotors have numerous disadvantages. First, the ports in the cylinder wall subjected to pressure, lower the strength of this cylinder, thus restricting the allowable pressures of fluid. Second, it is not possible to select a purely arbitrary position for the piston in the cylinder, since the piston can practically occupy but a definite number of positions corresponding to the positions of the ports along the cylinder.

The present invention aims at avoiding these drawbacks. It enables to make a fluid-operated servomotor wherein the pressure of the driving fluid may be as high as wanted, and furthermore the piston can occupy, through simple means, every possible position in the cylinder.

The present invention has for its object a hydraulic jack provided with an exhaust port of variable position characterized in that it comprises a piston whose operative side is pierced with at least one duct leading to the lateral wall of this piston, and whose outlet may be obturated by means of a member sliding in a slot on the cylinder of the jack, located opposite said outlet.

Thus, the wall of the cylinder, in the portion of the latter subjected to pressure of the fluid, is perfectly continuous, this enabling it to stand very high pressures, whereas it is possible to give the sliding member an arbitrary displacement, this entailing an arbitrary position of the exhaust outlet and hence of the piston.

Among the applications of the servomotor according to the invention, one of the most interesting is its use as a device for raising implements and adjusting their operative depth relatively to the soil. It is possible to select, at any moment, through a mere displacement of the sliding member, the height of the implements relatively to the tractor.

Other objects and advantages of the invention will be apparent during the course of the following description.

In the accompanying drawing forming a part of this application and in which like numerals are employed to designate like parts throughout the same, Fig. 1 is a longitudinal section of a servomotor, according to the invention, of unidirectional action.

Fig. 2 is a section taken along line II—II of Fig. 1, and

Fig. 3 shows diagrammatically the connection of a tool carried by a traction-engine, and comprising a device according to the invention.

The cylinder 9 of the jack shown in Figs. 1 and 2, comprising an inlet 10 for the fluid, is provided towards its right-hand extremity, with two diametrically opposed slots 11. The piston 12 comprising piston rings 13, is pierced with a central duct 14 which divides into two secondary ducts 15 opening up opposite slots 11. It is further possible to provide, in case piston 12 is liable to rotate inside cylinder 9, an annular groove 16 around the piston for always allowing the exhaust of fluid flowing inside the ducts 15, through the slots 11. Slides 17 applied on the piston 12 are slidably mounted in said slots 11. The two slides are connected by a semi-annulus 18 (or by a ring) which surrounds cylinder 9 without ever coming in contact with it. This member 18 can be controlled by any mechanical means; as shown in Figs. 2 and 3 it is linked through a rod 32 to a hand lever 33 associated with a toothed sector 34 for maintaining the lever, and hence the slides 17, in any one of a number of fixed positions. An abutment 19 located at the end of the slots 11, prevents slides 17 from reaching, when displaced towards the right, the end of these slots, thus always ensuring an outlet to ducts 15 even when the slides are at the rightmost position and preventing inadvertent end adjustment which would result in the ducts moving past the end of the slot. It is possible to avoid resorting to abutments 19 by ending the slots 11 towards the right through a narrow portion 19a into which the tip of the slides cannot penetrate. It will be assumed further that the cylinder 9 is fast with any member and that rod 20 on which piston 12 acts is connected through any transmission to a second member moving relatively to the first one. It will be further assumed that a permanent force acts on the second member in the direction which tends to push piston 12 towards the left of Fig. 1.

Inlet 10 is connected to the source of fluid under pressure liable to supply a permanent flow. When the slides 17 are given any position in the slots 11, piston 12 moves until the outlets of ducts 15 reach the level of the right-hand side of said slides. At that moment, the motion of the piston is stopped, since the pressure of fluid is limited by the exhaust of fluid through the ducts 15.

Hence the piston is in a stable position, since it cannot move towards the right, owing to the forces acting on the second member. It cannot either move towards the left, since in this case, ducts 15 would be obturated and the pressure of the fluid, again operative, would return the piston to its former position.

In the case considered of a permanent force acting on the second member, the connection of the rod to the piston may be effected, as shown in Fig. 1, by mere jointing.

Moreover, the slots 11 which allow the displacement of the slides, occupy a portion of the cylinder which is not subjected to the pressure of the fluid and which may be of reduced strength. Lastly very slight radial forces are exerted on the slides since each of them is practically subjected only to a force corresponding to the pressure of fluid multiplied by the cross-section of ducts 15 which may be very small.

When using, as shown in Fig. 1, two diametrically opposed slides rigidly connected to one another, the efforts exerted on both these slides balance one another.

Fig. 3 shows diagrammatically the application of the jack illustrated in Figs. 1 and 2, to a tractor for raising implements and for adjusting the operative depth thereof.

Tractor 21 carries and drives a tool 22 through the conventional hinged quadrilateral formed by the compression bar 23 and by the double tension bar 24.

Jack 31 of the type illustrated in Fig. 3, is permanently fed by means of the oil-pump 25 sucking up oil contained in a vessel formed in the tractor, this oil being discharged by the jack into said vessel along the arrow f. Rod 20 acts, through lever 26 and rod 27, on the hinged quadrilateral and on tool 22 in the raising direction. This tool tends always to move down owing to its weight and further to the reaction of the ground on the tip of the tool when the latter is in operation. Rod 20 is therefore always subjected to a thrust towards the left. By displacing the slides 17 through the agency of the rod 32 and lever 33, it is possible to select at each moment the level of the tool relatively to the soil and therefore to determine its operative depth, or else to raise completely this tool for allowing, for instance, the motion of the tractor over a road.

What I claim is:

1. A tractor having means for the attachment of an agricultural implement and a hydraulically-operated device for raising the implement with reference to the tractor, said device comprising a cylinder having an intake connected to a source of liquid pressure adapted to feed continuously to said cylinder and an exhaust in the form of a slot extending longitudinally along part of a generatrix of said cylinder, a piston slidable with a leak-tight fit in said cylinder and having a pressure-bearing face opposed to said intake and an operative face connected with the implement and formed with a duct having an inlet opening on said pressure-bearing face and an outlet opening on the lateral surface of the piston and registering with said slot, an obturating member for said duct disposed within and movable along said slot in slidable contact engagement with the lateral surface of said piston, and control means for adjusting the position of said obturating member along said slot.

2. Device as recited in claim 1 wherein the operative face of the piston is adapted for unidirectional action, in the direction corresponding to a raising of the implement.

References Cited in the file of this patent

UNITED STATES PATENTS

| | | |
|---|---|---|
| 1,548,232 | Westbrook | Aug. 4, 1925 |
| 1,630,810 | Simpson | May 31, 1927 |
| 1,747,468 | Cowardin | Feb. 18, 1930 |
| 2,059,082 | Brady et al. | Oct. 27, 1936 |
| 2,118,180 | Ferguson | May 24, 1938 |
| 2,650,528 | Morgen | Sept. 1, 1953 |

FOREIGN PATENTS

| | | |
|---|---|---|
| 223,726 | Switzerland | Jan. 4, 1943 |